US010062082B2

(12) United States Patent
Unser et al.

(10) Patent No.: US 10,062,082 B2
(45) Date of Patent: Aug. 28, 2018

(54) METHOD AND SYSTEM FOR IDENTIFYING PAYMENT CARD HOLDER INTERESTS AND HOBBIES

(71) Applicant: MASTERCARD INTERNATIONAL INCORPORATED, Purchase, NY (US)

(72) Inventors: Kenny Unser, Fairfield, CT (US); Jean Pierre Gerard, Croton-on-Hudson, NY (US); Kent Olof Niklas Berntsson, Rye, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 545 days.

(21) Appl. No.: 14/446,762

(22) Filed: Jul. 30, 2014

(65) Prior Publication Data
US 2016/0034916 A1    Feb. 4, 2016

(51) Int. Cl.
G06Q 30/02    (2012.01)
G06Q 30/06    (2012.01)

(52) U.S. Cl.
CPC ..... G06Q 30/0201 (2013.01); G06Q 30/0631 (2013.01)

(58) Field of Classification Search
None
See application file for complete search history.

(56) References Cited

U.S. PATENT DOCUMENTS

2012/0095805 A1* 4/2012 Ghosh ................ G06Q 30/0201
                                                        705/7.34
2015/0371238 A1* 12/2015 Wang .................... G06O 30/02
                                                        705/30

OTHER PUBLICATIONS

Aminul Islam and Ku Amir Ku Daud, "Factors That Influence Customers' Buying Intention on Shopping Online," Feb. 2011, International Journal of Marketing Studies, vol. 3, No. 1, pp. 128-139 (Year: 2011).*

* cited by examiner

Primary Examiner — Matthew S Gart
Assistant Examiner — Amanda Gurski
(74) Attorney, Agent, or Firm — Ohlandt, Greeley, Ruggiero & Perle, L.L.P.

(57) ABSTRACT

A method and a system are provided for identifying payment card holder hobbies or interests. The method includes retrieving from one or more databases a first set of information comprising payment card transaction information, payment card holder information and merchant information. The method further includes analyzing the first set of information to construct one or more groupings of merchants based on merchant line of business or merchant association with a hobby or interest; analyzing the first set of information to identify one or more payment card holder purchase behaviors; and associating the one or more payment card holder purchase behaviors with the one or more groupings of merchants to identify one or more payment card holder hobbies or interests. The method and system provide advantages in fraud prevention, and can also be used by merchants or businesses to better target customers or enhance existing customer relationships.

22 Claims, 7 Drawing Sheets

US 10,062,082 B2

METHOD AND SYSTEM FOR IDENTIFYING PAYMENT CARD HOLDER INTERESTS AND HOBBIES

BACKGROUND OF THE DISCLOSURE

1. Field of the Disclosure

The present disclosure relates to a method and a system for identifying payment card holder hobbies or interests. In particular, the present disclosure relates to a method and a system for identifying payment card holder hobbies or interests based on payment card holder purchase behavior, and groupings of merchants based on the merchants line of business or the merchants association with a hobby or interest. The method and system can be used by merchants or businesses to better target customers or enhance existing customer relationships. The method and system can also provide advantages in fraud prevention.

2. Description of the Related Art

Manufacturers, retailers, or other sellers of products (e.g., goods and services) spend a lot of time and money trying to devise ways to get a consumer to buy their products. For example, companies advertise, send incentives for discounts, offer rewards, and other incentives to get consumers to initiate a transaction for the products. However, these efforts are typically provided to the public at large, or at least a relatively large group of consumers, which can result in a high cost and a low return. Also, the timing of any efforts is typically based on when the seller wants to send an incentive, with the seller having no insight as to a beneficial time or manner to send an incentive.

The availability of payment card transaction data provides unique opportunities to service a customer using a payment card. A possible benefit is that if the purchasing behavior of a payment card user is known, targeted advertising can be sent to the user of the payment card. Thus, the user is informed of goods or services (products) that are available at a particular merchant, and the issuer receives the possible benefit of one or more additional transactions being conducted by the payment card user.

A security concern with the use of payment cards is their use at merchants other than the customary merchants used by a payment card user. Often, an issuer of a payment card (such as, for example, credit card, debit card, and prepaid card) has security concerns when questionable transactions at points of sale occur at merchants never before used by the payment card user.

Thus, a need exists for a system and a method that can identify, with as much certainty as possible, associations between merchants and payment card users, including purchasing behavior of the payment card users, that may represent an opportunity for a merchant to offer products or services to the consumer that are specifically tailored to the consumer's upcoming need or desire and communicate the offers to the consumer. Further, a need exists for a system and a method that can identify, with as much certainty as possible, associations between merchants and payment card users, including purchasing behavior of the payment card users, that can help to prevent or reduce the risk of fraud associated with payment card transactions.

Yet further, a need exists for a system and a method that can analyze purchasing or spending behavior of payment card users, identify patterns that suggest that a payment card user has a particular set of life style behaviors (e.g., hobbies, interests, and the like), and use that information for applications such as making offers, preventing fraud (e.g., don't decline a transaction at Pebble Beach golf course if the payment card user is clearly a golfer), targeted advertisements, and the like.

SUMMARY OF THE DISCLOSURE

The present disclosure provides a method and a system for identifying payment card holder hobbies or interests based on payment card holder purchase behavior, and groupings of merchants based on the merchants line of business or the merchants association with a hobby or interest. The method and system can be used by merchants or businesses to better target customers or enhance existing customer relationships, and can also provide advantages in fraud prevention.

The present disclosure also provides a method that includes retrieving from one or more databases a first set of information comprising payment card transaction information, payment card holder information and merchant information. The method further includes analyzing the first set of information to construct one or more groupings of merchants based on merchant line of business or merchant association with a hobby or interest; analyzing the first set of information to identify one or more payment card holder purchase behaviors; and associating the one or more payment card holder purchase behaviors with the one or more groupings of merchants to identify one or more payment card holder hobbies or interests.

The present disclosure further provides developing logic for associating the one or more payment card holder purchase behaviors with the one or more groupings of merchants to identify one or more payment card holder hobbies or interests. The present disclosure yet further provides applying the logic to a universe of payment card holders to identify one or more payment card holder hobbies or interests of the universe of payment card holders.

The present disclosure also provides a system that includes one or more databases including a first set of information comprising payment card transaction information, payment card holder information and merchant information. The system further includes a processor configured to: analyze the first set of information to construct one or more groupings of merchants based on merchant line of business or merchant association with a hobby or interest; analyze the first set of information to identify one or more payment card holder purchase behaviors; and associate the one or more payment card holder purchase behaviors with the one or more groupings of merchants to identify one or more payment card holder hobbies or interests.

The present disclosure further provides a system in which the processor is configured with programmed logic for associating the one or more payment card holder purchase behaviors with the one or more groupings of merchants to identify one or more payment card holder hobbies or interests. The present disclosure yet further provides a system in which the processor is configured to apply the logic to a universe of payment card holders to identify one or more payment card holder hobbies or interests of the universe of payment card holders.

The present disclosure still further provides a method for generating one or more predictive payment card holder hobby or interest profiles. The method includes retrieving from one or more databases a first set of information comprising payment card transaction information, payment card holder information and merchant information. The method further includes analyzing the first set of information to construct one or more groupings of merchants based on merchant line of business or merchant association with a hobby or interest; analyzing the first set of information to identify one or more payment card holder purchase behaviors; correlating the one or more payment card holder purchase behaviors with the one or more groupings of merchants to identify one or more associations between one or more payment card holders and one or more hobbies or interests; and generating one or more predictive payment card holder hobby or interest profiles based on the one or more associations between one or more payment card holders and one or more hobbies or interests.

The present disclosure also provides a system that includes providing targeted information, based on the one or more predictive payment card holder hobby or interest profiles, to a payment card holder, and determining fraud risk based on the one or more predictive payment card holder hobby or interest profiles.

DESCRIPTION OF THE EMBODIMENTS

Figure 1:
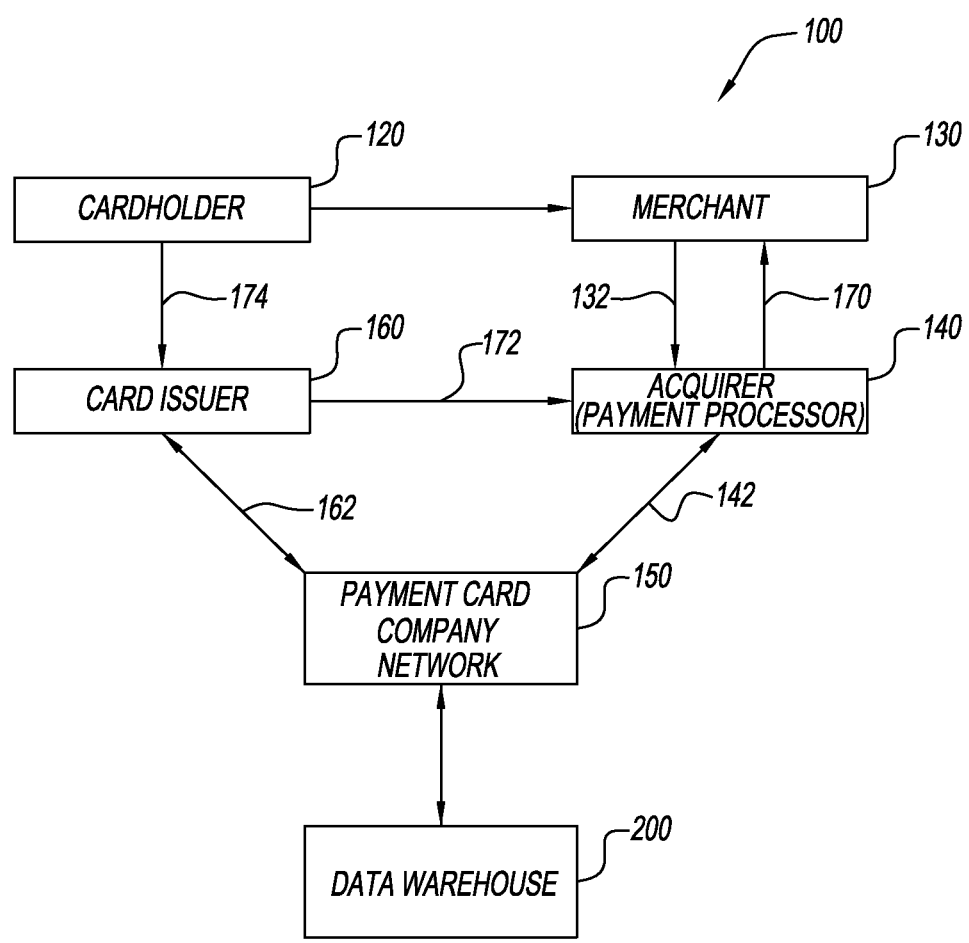
FIG. 1 is a diagram of a four party payment card system.

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these embodiments are provided so that this disclosure clearly satisfies applicable legal requirements. Like numbers refer to like elements throughout.

As used herein, entities can include one or more persons, organizations, businesses, institutions and/or other entities, such as financial institutions, services providers, and the like that implement one or more portions of one or more of the embodiments described and/or contemplated herein. In particular, entities can include a person, business, school, club, fraternity or sorority, an organization having members in a particular trade or profession, sales representative for a particular product, charity, not-for-profit organization, labor union, local government, government agency, or political party. It should be understood that the methods and systems of this disclosure can be practiced by a single entity or by multiple entities. Although different entities can carry out different steps or portions of the methods and systems of this disclosure, all of the steps and portions included in the methods and systems of this disclosure can be carried out by a single entity.

As used herein, payment cards used for purchases can include any type of payment devices known in the art that are capable of being used for purchases. For example, payment devices can include the traditional magnetic stripe card, contactless payments, smart cards, virtual card numbers, electronic wallets, and the like. Smart cards are a newer generation of card that contain an integrated circuit. Some smart cards have metal contacts to electrically connect the card to the reader, and contactless cards use a magnetic field or radio frequency (RFID) for proximity reading. Hybrid smart cards include a magnetic stripe in addition to the chip. This is most commonly found in a payment card, so that the payment cards are also compatible with payment terminals that do not include a smart card reader. Cards with all three features: magnetic stripe, smart card chip, and RFID chip are also becoming common as more activities require the use of such cards.

As used herein, the one or more databases configured to store the first set of information or from which the first set of information is retrieved, and the one or more databases configured to store the second set of information or from which the second set of information is retrieved, can be the same or different databases.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage device, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc" as used herein, include compact disc (CD), laser disc, optical disc, digital versatile disc (DVD), floppy disk and blu-ray disc where disks usually reproduce data magnetically, while discs usually reproduce data optically with lasers. Combinations of the above are included within the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means that implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process so that the instructions that execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the present disclosure.

Thus, systems, methods and computer programs are herein disclosed to retrieve from one or more databases a first set of information comprising internal information (e.g., payment card transaction information, payment card holder information and merchant information), and optionally retrieve from one or more databases a second set of information comprising external information (e.g., geographic data, firmographic data, demographic data, and lists of individuals with interests and/or hobbies). The first set of information is analyzed to construct one or more groupings of merchants based on merchant line of business or merchant association with a hobby or interest. The first set of information is also analyzed to identify one or more payment card holder purchase behaviors. One or more payment card holder purchase behaviors are associated (e.g., algorithmically) with one or more groupings of merchants to identify one or more payment card holder hobbies or interests.

Among many potential uses, the systems and methods described herein can be used to: (1) allow merchants to better target customers and/or enhance existing customer relationships; and (2) prevent or reduce the risk of fraud associated with payment card transactions. Other uses are possible.

Referring to the drawings and, in particular, FIG. 1, there is shown a four party payment (credit, debit or other) card system generally represented by reference numeral 100. In payment card system 100, card holder 120 submits the payment card to the merchant 130. The merchant's point of sale (POS) device communicates 132 with his acquiring bank or acquirer 140, which acts as a payment processor. The acquirer 140 initiates, at 142, the transaction on the payment card company network 150. The payment card company network 150 (that includes a financial transaction processing company) routes, via 162, the transaction to the issuing bank or card issuer 160, which is identified using information in the transaction message. The card issuer 160 approves or denies an authorization request, and then routes, via the payment card company network 150, an authorization response back to the acquirer 140. The acquirer 140 sends approval to the POS device of the merchant 130. Thereafter, seconds later, if the transaction is approved, the card holder completes the purchase and receives a receipt.

The account of the merchant 130 is credited, via 170, by the acquirer 140. The card issuer 160 pays, via 172, the acquirer 140. Eventually, the card holder 120 pays, via 174, the card issuer 160.

Data warehouse 200 is a database used by payment card company network 150 for reporting and data analysis. According to one embodiment, data warehouse 200 is a central repository of data that is created by storing certain transaction data from transactions occurring within four party payment card system 100. According to another embodiment, data warehouse 200 stores, for example, the date, time, amount, location, merchant code, and merchant category for every transaction occurring within payment card network 150.

In yet another embodiment, data warehouse 200 stores, reviews, and/or analyzes information used in constructing (i) the one or more groupings of merchants based on merchant line of business or merchant association with a hobby or interest, (ii) the one or more payment card holder purchase behaviors, (iii) the one or more payment card holder hobbies or interests, and (iv) the one or more predictive payment card holder hobby or interest profiles.

In still another embodiment, data warehouse 200 stores, reviews, and/or analyzes information used in creating one or more datasets to store information relating to (i) one or more groupings of merchants based on merchant line of business or merchant association with a hobby or interest, (ii) one or more payment card holder purchase behaviors, (iii) one or more payment card holder hobbies or interests, and (iv) one or more predictive payment card holder hobby or interest profiles.

In another embodiment, data warehouse 200 stores, reviews, and/or analyzes information used in developing logic for creating (i) the one or more groupings of merchants based on merchant line of business or merchant association with a hobby or interest, (ii) the one or more payment card holder purchase behaviors, (iii) the one or more payment card holder hobbies or interests, and (iv) the one or more predictive payment card holder hobby or interest profiles, and applying the logic to a universe of payment card holders to identify one or more payment card holder hobbies or interests of the universe of payment card holders.

In still another embodiment, data warehouse 200 stores, reviews, and/or analyzes information used in quantifying the strength of the one or more associations of the one or more payment card holder purchase behaviors with the one or more groupings of merchants to identify the strength of the one or more payment card holder hobbies or interests.

In another embodiment, data warehouse 200 stores, reviews, and/or analyzes information, with respect to the one or more associations between the one or more payment card holder purchase behaviors with the one or more groupings of merchants, used in assigning attributes to the one or more payment card holder purchase behaviors and the one or more groupings of merchants, wherein the attributes are selected from one or more of confidence, time, and frequency.

In yet another embodiment, data warehouse 200 stores, reviews, and/or analyzes information used in identifying one or more payment card holder purchase behaviors, one or more groupings of merchants based on merchant line of business or merchant association with a hobby or interest, and strength of the one or more associations between the one or more payment card holder purchase behaviors and the one or more groupings of merchants.

In still another embodiment, data warehouse 200 stores, reviews, and/or analyzes information used in determining fraud risk based on the one or more associations between the one or more payment card holder purchase behaviors and the one or more groupings of merchants, or targeting information including at least one or more suggestions or recommendations for payment card holder spending or purchasing activity at a merchant, based on the one or more associations between the one or more payment card holder purchase behaviors and the one or more groupings of merchants.

In another embodiment, data warehouse 200 aggregates the information by payment card holder, merchant, category and/or location. In still another embodiment, data warehouse 200 integrates data from one or more disparate sources. Data warehouse 200 stores current as well as historical data and is used for creating reports, performing analyses on the network, merchant analyses, and performing predictive analyses.

Figure 2:
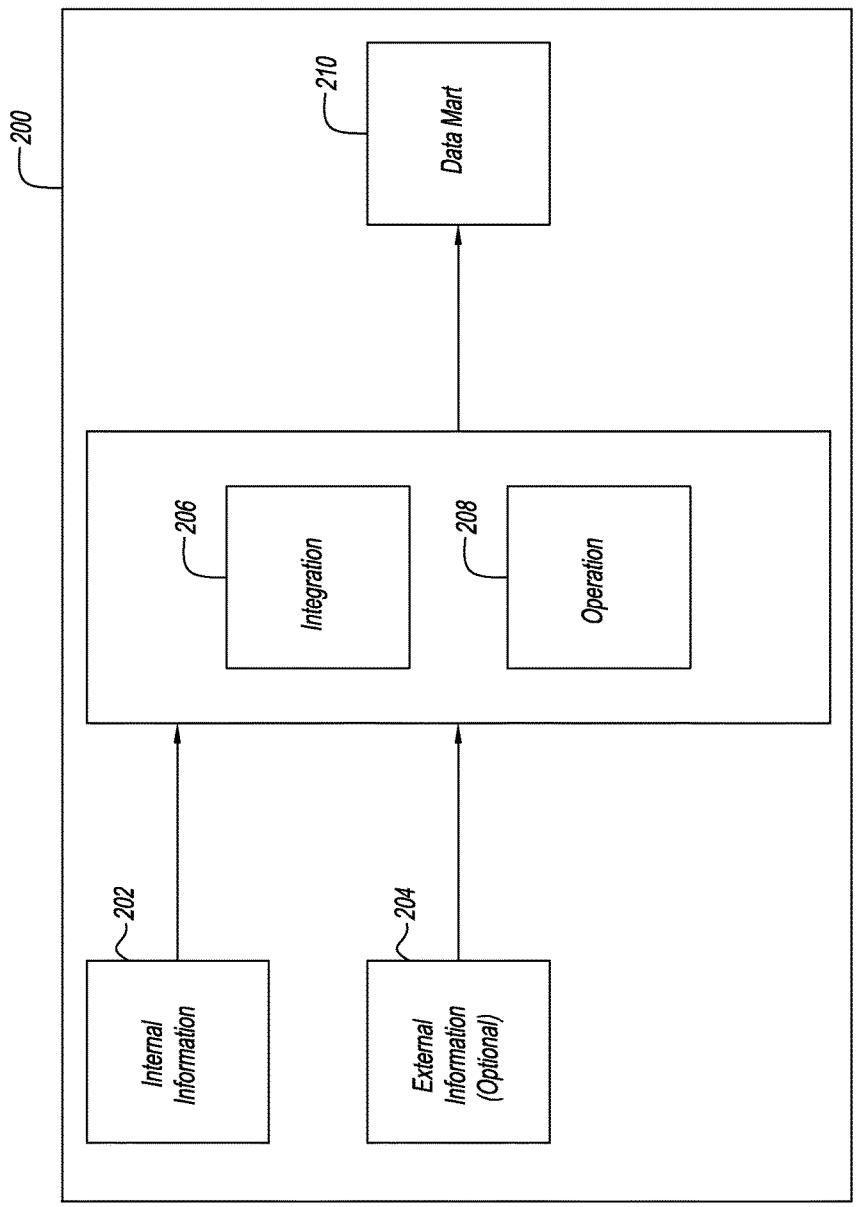
FIG. 2 illustrates a data warehouse shown in FIG. 1 that is a central repository of data that is created by storing certain transaction data from transactions occurring in four party payment card system of FIG. 1.

Referring to FIG. 2, an exemplary data warehouse 200 (the same data warehouse 200 in FIG. 1) for reporting and data analysis, including the storing, reviewing, and/or analyzing of information, for the various purposes described above is shown. The data warehouse 200 can have a plurality of entries (e.g., entries 202 and 204).

The internal information (e.g., payment card transaction information) 202 can contain, for example, payment card transaction information, payment card holder information, merchant information, and purchasing and payment activities attributable to purchasers (e.g., payment card holders), that are aggregated by payment card holder, merchant, category and/or location in the data warehouse 200. The external information 204 includes, for example, geographic data, firmographic data, demographic data, and lists of individuals with interests and/or hobbies. The external information 204 can include other suitable information that can be useful in constructing one or more groupings of merchants based on merchant line of business or merchant association with a hobby or interest, constructing the one or more payment card holder purchase behaviors, and constructing the one or more payment card holder hobbies or interests.

The typical data warehouse uses staging, data integration, and access layers to house its key functions. The staging layer or staging database stores raw data extracted from each of the disparate source data systems. The integration layer integrates at 206 the disparate data sets by transforming the data from the staging layer often storing this transformed data in an operational data store database 208. For example, the payment card transaction information 202 can be aggregated by merchant, category and/or location at 206. Also, the reporting and data analysis, including the storing, reviewing, and/or analyzing of information, for the various purposes described above, can occur in data warehouse 200. The integrated data is then moved to yet another database, often called the data warehouse database or data mart 210, where the data is arranged into hierarchical groups often called dimensions and into facts and aggregate facts. The access layer helps users retrieve data.

A data warehouse constructed from an integrated data source systems does not require staging databases or operational data store databases. The integrated data source systems can be considered to be a part of a distributed operational data store layer. Data federation methods or data virtualization methods can be used to access the distributed integrated source data systems to consolidate and aggregate data directly into the data warehouse database tables. The integrated source data systems and the data warehouse are all integrated since there is no transformation of dimensional or reference data. This integrated data warehouse architecture supports the drill down from the aggregate data of the data warehouse to the transactional data of the integrated source data systems.

The data mart 210 is a small data warehouse focused on a specific area of interest. For example, the data mart 210 can be focused on one or more of reporting and data analysis, including the storing, reviewing, and/or analyzing of information, for any of the various purposes described above. Data warehouses can be subdivided into data marts for improved performance and ease of use within that area. Alternatively, an organization can create one or more data marts as first steps towards a larger and more complex enterprise data warehouse.

This definition of the data warehouse focuses on data storage. The main source of the data is cleaned, transformed, cataloged and made available for use by managers and other business professionals for data mining, online analytical processing, market research and decision support. However, the means to retrieve and analyze data, to extract, transform and load data, and to manage the data dictionary are also considered essential components of a data warehousing system. Many references to data warehousing use this broader context. Thus, an expanded definition for data warehousing includes business intelligence tools, tools to extract, transform and load data into the repository, and tools to manage and retrieve metadata.

Algorithms can be employed to determine formulaic descriptions of the integration of the data source information using any of a variety of known mathematical techniques. These formulas in turn can be used to derive or generate one or more analyses and updates for analyzing, creating, comparing and identifying activities using any of a variety of available trend analysis algorithms. For example, these formulas can be used in the reporting and data analysis, including the storing, reviewing, and/or analyzing of information, for the various purposes described above.

Figure 3:
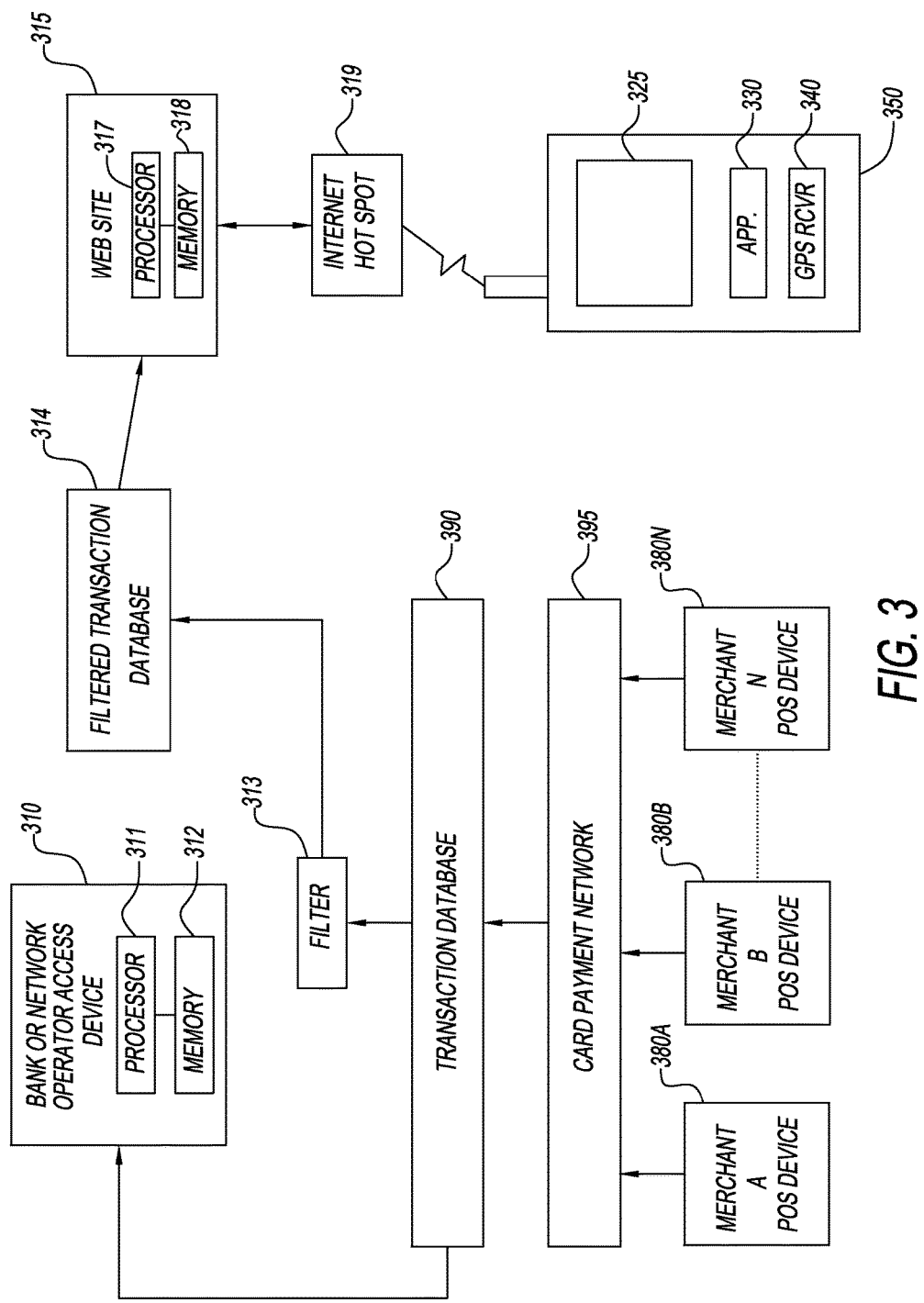
FIG. 3 is a block diagram of a portion of a payment card system used in accordance with the present disclosure.

Referring to FIG. 3, a portion of a payment card system used in accordance with the present disclosure is shown. Each merchant that accepts a payment card has on their premises at least one point of sale device 380, of a type well known in the art, for initiating customer transactions. These point of sale devices 380A, 380B, . . . 380N, generally have a keyboard data pad for entering data when a card's magnetic coding becomes difficult to read, or for the purpose of entering card data resulting from telephone calls during which the customer provides card data by telephone.

Point of sale devices 380A, 380B, . . . 380N are connected by a suitable card payment network 395 (the payment card company network 150 in FIG. 1) to a transaction database 390 associated with or within card payment network 395 that stores information concerning the transactions. The transaction database 390 is included in the data warehouse 200 in FIGS. 1 and 2. An example of such a card payment network 395 is BankNet® operated by MasterCard International Incorporated. BankNet is a four party payment network that connects a card issuer, a card holder, merchants, and an acquiring bank, as is well known in the art. In another embodiment, card payment network 395 can be a three party system. In any such embodiment, POS devices 380 do not have direct access to transaction database 390. It is the operator of card payment network 395 that can access transaction database 390 in a three party system.

Information in transaction database 390 can be accessed by a bank or network operator access device 310, such as a computer having a processor 311 and a memory 312. Users of device 310 can be employees of the bank or a payment network operator who are doing research or development work, such as running inquiries, to carry out the reporting and data analysis, including the storing, reviewing, and/or analyzing of information, for the various purposes described above.

Transaction records stored in transaction database 390 contain information that is highly confidential and must be maintained confidential to prevent fraud and identity theft. The transaction records stored in transaction database 390 can be anonymized by using a filter 313 that removes confidential information, but retains records concerning all of the other transaction related details discussed above, preferably in real time. Anonymized data is generally necessary for marketing applications. The filtered data is stored in a filtered transaction database 314 that can be accessed as described below. The data in the filtered transaction database 314 can be stored in any type of memory including a hard drive, a flash memory, on a CD, in a RAM, or any other suitable memory.

The following example of an approach to accessing the data involves a mobile telephone. However, it is understood that that there are various other approaches, technologies and pathways that can be used, including direct access by employees of the card issuing bank or a payment network operator.

A mobile telephone 350 having a display 325 can have a series of applications or applets thereon including an applet or application program (hereinafter an application ("APP.") 330 for use with the embodiment described herein. Mobile telephone 350 can also be equipped with a GPS receiver 340 so that its position is always known.

Mobile telephone 350 can be used to access a website 315 on the Internet, via an Internet connected Wi-Fi hot spot 319 (or by any telephone network, such as a 3G or 4G system, on which mobile telephone 350 communicates), by using application 330. Website 315 is linked to filtered transaction database 314 so that authorized users of website 315 can have access to the data contained therein. These users can be employees of the bank or a network operator who are making inquiries as described above with bank or operator access device 310.

Web site 315 has a processor 317 for assembling data from filtered transaction database 314 for responding to inquiries. A memory 318 associated with web site 315 having a non-transitory computer readable medium, stores computer readable instructions for use by processor 317 in implementing the operation of the disclosed embodiment.

Figure 4:
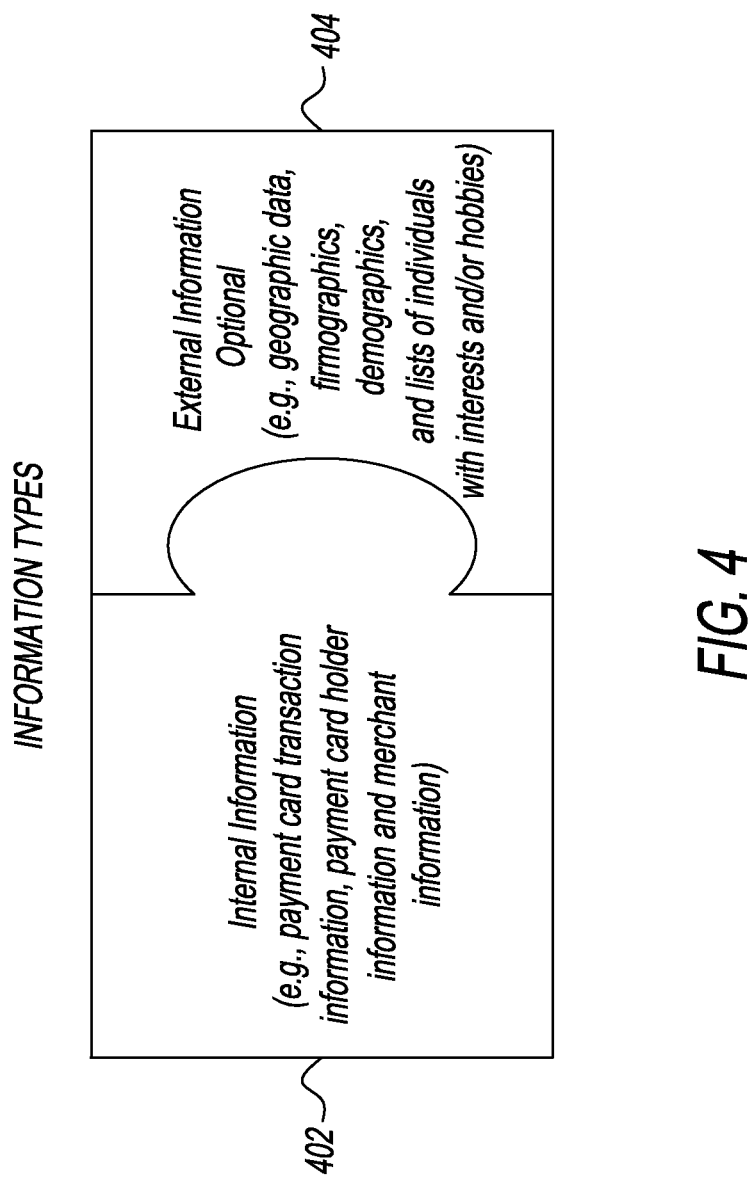
FIG. 4 shows illustrative information types used in the systems and the methods of the present disclosure.

In accordance with the method of this disclosure, information that is stored in one or more databases can be retrieved (e.g., by a processor). FIG. 4 shows illustrative information types used in the systems and methods of this disclosure.

The information can contain, for example, a first set of information including internal information 402, meaning information that can be retrieved from one or more databases owned or controlled by an entity, for example, a payment card company (part of the payment card company network 150 in FIG. 1). Illustrative first set of information can include, for example, payment card transaction information, payment card holder information, merchant information, transaction date and time, and transaction amount. In particular, the payment card transaction information can include, for example, transaction date/time, transaction amount, payment card holder information (e.g., payment card holder account identifier (likely anonymized), payment card holder geography (potentially modeled), payment card holder type (consumer/business), payment card holder demographics, and the like), merchant information (e.g., merchant name, merchant geography, merchant line of business, and the like). Information for inclusion in the first set of information can be obtained, for example, from payment card companies known as MasterCard®, Visa®, American Express®, and the like (part of the payment card company network 150 in FIG. 1).

Also, the information can optionally contain, for example, a second set of information including external information 404, meaning information that is not owned by an entity involved in the payment transaction, but rather is retrieved by an entity from a third party source. Illustrative second set information can include, for example, geographic data, firmographic data, demographic data, lists of individuals with interests and/or hobbies, and the like. In particular, the second set of information can include, for example, geographic data, geographic areas (e.g., ZIP codes, metropolitan areas (metropolitan statistical area (MSA), designated market area (DMA), and the like), event venues, and the like), calendar information (e.g., open seasons such as beach seasons, ski seasons, and the like, retail calendar, seasonal/holiday information such as observances of shifting holidays such as Easter), weather (e.g., snowfall, rain, temperature, and the like), map data (e.g., highway exits, travel time, rest areas, nearest airport, and the like), and the like. The second set of information affords leveraged data sources that can supplement information in the first set of information.

The external information 404 can further include firmographics data, for example, line of operations for a business, information related to employees, revenues and industries, and the like. In particular, the firmographics data relates to information on merchants that is typically used in credit decisions, business-to-business marketing and supply chain management.

Illustrative information in the firmographics data source includes, for example, information concerning merchant background, merchant history, merchant special events, merchant operation, merchant payments, merchant payment trends, merchant financial statement, merchant public filings, and the like merchant information.

Merchant background information can include, for example, ownership, history and principals of the merchant, and the operations and location of the merchant.

Merchant history information can include, for example, incorporation details, par value of shares and ownership information, background information on management, such as educational and career history and company principals, related companies including identification of affiliates including, but not limited to, parent, subsidiaries and/or branches worldwide. The merchant history information can also include corporate registration details to verify the existence of a registered organization, confirm legal information such as a merchant's organizational structure, date and state of incorporation, and research possible fraud by reviewing names of principals and business standing in a state.

Merchant special event information can include, for example, any developments that can impact a potential relationship with a company, such as bankruptcy filings, changes in ownership, acquisitions and other events. Other special event information can include announcements on the release of earnings reports. Special events can help explain unusual company trends, for example, a change in ownership could have an impact on manner of payment, or decreased production may reflect an unexpected interruption in factory operations (i.e., labor strike or fire).

Merchant operational information can include, for example, the identity of the parent company, the number of accounts and geographic scope of the business, typical selling terms, and whether the merchant owns or leases its facilities. The names and locations of branch operations and subsidiaries can also be identified.

Merchant payment information can include, for example, a listing of recent payments made by a company. An unusually large number of transactions during a single month or time period can indicate a seasonal purchasing pattern. The information can show payments received prior to date of invoice, payments received within trade discount period, payments received within terms granted, and payments beyond vendor's terms.

Merchant payment trend information can include, for example, information that spots trends in a merchant's business by analyzing how it pays its bills.

Merchant financial statement information can include, for example, a formal record of the financial activities and a snapshot of a merchant's financial health. Financial statements typically include four basic financial statements, accompanied by a management discussion and analysis. The Balance Sheet reports on a company's assets, liabilities, and ownership equity at a given point in time. The Income Statement reports on a company's income, expenses, and profits over a period of time. Profit & Loss accounts provide information on the operation of the enterprise. These accounts include sale and the various expenses incurred during the processing state. The Statement of Retained Earnings explains the changes in a company's retained earnings over the reporting period. The Statement of Cash Flows reports on a company's cash flow activities, particularly its operating, investing and financing activities.

Merchant public filing information can include, for example, bankruptcy filings, suits, liens, and judgment information obtained from Federal and State court houses for a company.

Demographic information can also be used to supplement or leverage the first set of information. Illustrative demographic information includes, for example, age, income, presence of children, education, and the like.

Information contained in lists of individuals with interests and hobbies can also be used to supplement or leverage the first set of information. Illustrative lists include, for example, list of season pass holders at a ski resort, list of individuals holding warrantees on Harley Davidson motorcycles, list of team rosters from a national hockey tournament, and the like.

With regard to the sets of information, filters can be employed to select particular portions of the information. For example, time range filters can be used that can vary based on need or availability.

In an embodiment, all information stored in each of the one or more databases can be retrieved. In another embodiment, only a single entry in each database can be retrieved. The retrieval of information can be performed a single time, or can be performed multiple times. In an exemplary embodiment, only information pertaining to a specific predictive payment card holder hobby or interest profile is retrieved from each of the databases.

The overall process flow of this disclosure generally involves data analysis and applying insights. The data analysis portion includes constructing the universe of data in a data layout that includes internal information and external information as shown in FIG. 4 and described herein. The analyzing data portion includes constructing logical groupings of merchants, classifying data and/or aggregating data to support payment card holder purchase behavior determinations that can be made in part using purchase transaction information, and creating one or more algorithms for associating payment card holder purchase behaviors with groupings of merchants to identify payment card holder hobbies or interests.

With regard to constructing logical groupings of merchants, merchants can be in the same line of business (e.g., ski resorts), merchants can have an association with a single hobby (e.g., ski shop), merchants can have an association with multiple hobbies (e.g., outdoor sports retailer), and merchants can be geographically associated with a certain hobby (e.g., diner or gas station next to a ski resort).

Merchant groupings can be determined in different ways, for example, by manual assignment or by automatic assignment. For manual assignment, an individual assigns merchants to a category based on research and/or known facts (e.g., line of business). For automatic assignment, data is self organized based on observations like payment card holder overlap. Standard statistical techniques can be employed, for example, clustering, regression, correlation, segmentation, raking, and the like.

The groupings of merchants can contain information including, for example, merchant identification, grouping identification, time period (e.g., ski resort versus mountain biking resort). The groupings of merchants can also contain information regarding factors such as quantification of how strong a merchant is tied to a merchant grouping (e.g., a ski resort is a strong indicator of an interest in skiing while shopping at an outdoor store in winter is a weak indicator of an interest in skiing).

As indicated herein, the merchant information can include categorization of merchants. The one or more databases are used for storing profiles of one or more merchants, and merchants belonging to a particular category, e.g., industry category. Illustrative merchant categories are described herein. The merchant categorization is useful for associating with payment card holder purchase behaviors to identify one or more payment card holder hobbies or interests.

In an embodiment, a merchant category can include a segment of a particular industry. In some embodiments, the merchant category can be defined using merchant category codes according to predefined industries, which can be aligned using standard industrial classification codes, or using the industry categorization described herein.

Merchant categorization indicates the category or categories assigned to each merchant name. As described herein, merchant category information is used primarily for purposes of associating with payment card holder purchase behaviors to identify one or more payment card holder hobbies or interests, although other uses are possible. According to one embodiment, each merchant name is associated with only one merchant category. In alternate embodiments, however, merchants are associated with a plurality of categories as apply to their particular businesses. Generally, merchants are categorized according to conventional industry codes as defined by a selected external source (e.g., a merchant category code (MCC), Hoovers™, the North American Industry Classification System (NAICS), and the like). However, in one embodiment, merchant categories are assigned based on system operator preferences, or some other similar categorization process.

An illustrative merchant categorization including industry codes is set forth below.

| INDUSTRY | INDUSTRY NAME |
|---|---|
| AAC | Children's Apparel |
| AAF | Family Apparel |
| AAM | Men's Apparel |
| AAW | Women's Apparel |
| AAX | Miscellaneous Apparel |
| ACC | Accommodations |
| ACS | Automotive New and Used Car Sales |
| ADV | Advertising Services |
| AFH | Agriculture/Forestry/Fishing/Hunting |
| AFS | Automotive Fuel |
| ALS | Accounting and Legal Services |
| ARA | Amusement, Recreation Activities |
| ART | Arts and Crafts Stores |
| AUC | Automotive Used Only Car Sales |
| AUT | Automotive Retail |
| BKS | Book Stores |
| BMV | Music and Videos |
| BNM | Newspapers and Magazines |
| BTN | Bars/Taverns/Nightclubs |
| BWL | Beer/Wine/Liquor Stores |
| CCR | Consumer Credit Reporting |
| CEA | Consumer Electronics/Appliances |
| CES | Cleaning and Exterminating Services |
| CGA | Casino and Gambling Activities |
| CMP | Computer/Software Stores |
| CNS | Construction Services |
| COS | Cosmetics and Beauty Services |
| CPS | Camera/Photography Supplies |
| CSV | Courier Services |
| CTE | Communications, Telecommunications Equipment |
| CTS | Communications, Telecommunications, Cable Services |
| CUE | College, University Education |
| CUF | Clothing, Uniform, Costume Rental |
| DAS | Dating Services |
| DCS | Death Care Services |
| DIS | Discount Department Stores |
| DLS | Drycleaning, Laundry Services |
| DPT | Department Stores |
| DSC | Drug Store Chains |
| DVG | Variety/General Merchandise Stores |
| EAP | Eating Places |
| ECA | Employment, Consulting Agencies |
| EHS | Elementary, Middle, High Schools |
| EQR | Equipment Rental |

-continued

| INDUSTRY | INDUSTRY NAME |
|---|---|
| ETC | Miscellaneous |
| FLO | Florists |
| FSV | Financial Services |
| GHC | Giftware/Houseware/Card Shops |
| GRO | Grocery Stores |
| GSF | Specialty Food Stores |
| HBM | Health/Beauty/Medical Supplies |
| HCS | Health Care and Social Assistance |
| HFF | Home Furnishings/Furniture |
| HIC | Home Improvement Centers |
| INS | Insurance |
| IRS | Information Retrieval Services |
| JGS | Jewelry and Giftware |
| LEE | Live Performances, Events, Exhibits |
| LLS | Luggage and Leather Stores |
| LMS | Landscaping/Maintenance Services |
| MAS | Miscellaneous Administrative and Waste Disposal Services |
| MER | Miscellaneous Entertainment and Recreation |
| MES | Miscellaneous Educational Services |
| MFG | Manufacturing |
| MOS | Miscellaneous Personal Services |
| MOT | Movie and Other Theatrical |
| MPI | Miscellaneous Publishing Industries |
| MPS | Miscellaneous Professional Services |
| MRS | Maintenance and Repair Services |
| MTS | Miscellaneous Technical Services |
| MVS | Miscellaneous Vehicle Sales |
| OPT | Optical |
| OSC | Office Supply Chains |
| PCS | Pet Care Services |
| PET | Pet Stores |
| PFS | Photofinishing Services |
| PHS | Photography Services |
| PST | Professional Sports Teams |
| PUA | Public Administration |
| RCP | Religious, Civic and Professional Organizations |
| RES | Real Estate Services |
| SGS | Sporting Goods/Apparel/Footwear |
| SHS | Shoe Stores |
| SND | Software Production, Network Services and Data Processing |
| SSS | Security, Surveillance Services |
| TAT | Travel Agencies and Tour Operators |
| TEA | T + E Airlines |
| TEB | T + E Bus |
| TET | T + E Cruise Lines |
| TEV | T + E Vehicle Rental |
| TOY | Toy Stores |
| TRR | T + E Railroad |
| TSE | Training Centers, Seminars |
| TSS | Other Transportation Services |
| TTL | T + E Taxi and Limousine |
| UTL | Utilities |
| VES | Veterinary Services |
| VGR | Video and Game Rentals |
| VTB | Vocation, Trade and Business Schools |
| WAH | Warehouse |
| WHC | Wholesale Clubs |
| WHT | Wholesale Trade |

In accordance with this disclosure, merchant categorization is important for associating with payment card holder purchase behaviors to identify one or more payment card holder hobbies or interests. Proper merchant categorization is important to obtain payment card holder hobby and interest results that are truly reflective of the particular payment card holder.

With regard to classifying data and/or aggregating data to support payment card holder purchase behavior determinations that can be made in part using purchase transaction information, indicators of travel and indicators of items purchases are used. Indicators of travel include, for example, gas, hotel, and dining transactions outside a payment card holder's area of residence. As an example of indicators of travel, a payment card holder makes several small ticket fuel ups and dining purchases that trace a route between the payment card holder's residence and Daytona Beach, Fla. in the days leading up to Daytona Bike Week. As an example of indicators of items purchased, a payment card holder makes a large ticket purchase at an outdoor's sporting goods store. Days later, the payment card holder pays a baggage fee and takes a flight to Colorado before paying for lodging at Vail Ski Resort in January. It may be concluded that the purchase of items at the outdoor store gives weight to the assessment that this payment card holder is a skier based on the timing and sequence of the purchase.

With regard to creating one or more algorithms for associating payment card holder purchase behaviors with groupings of merchants to identify payment card holder hobbies or interests, one illustrative method involves taking a known universe of skiers and observing their purchase behavior. Both internal data (e.g., a payment card holder bought a lift ticket in 2013) and external data (e.g., a payment card holder subscribes to Ski Magazine) can be used. The illustrative method further involves identifying payment card holder purchase behavior that seems to correlate with skiers, identifying similar payment card holder purchase behavior that are not in the list of skiers, and assessing whether the algorithm developed using the known universe of skiers is reliable in identifying other skiers using one or more of the following methods: survey individuals identified as having an interest or hobby, manual review of payment card holder purchase behavior to see if the conclusion makes sense, and observe whether the data has predictive power (e.g., of the set of payment card holders identified by the algorithm as skiers in November 2013, 80% purchased a lift ticket between December 2013 and March 2014).

Another illustrative method involves using statistical techniques to cluster payment card holders together based on common purchasing characteristics (self organizing the data), and reviewing the logic used in making the association of individuals to each other. If the association seems to be based around a hobby, assign the hobby to the rule set used to build the clusters.

Several insights that can be applied result from the method of this disclosure. One insight is to create a data mart 210 to store information specific to identifying payment card holder hobbies and interests. The data mart 210 can include existing data (e.g., payment card holder transaction data). The data mart 210 can also include purpose built data (e.g., custom aggregations, custom merchant sets, external data, and the like). The data mart 210 can further be a location to store output (e.g., predictive payment card holder hobby or interest profiles).

Another insight is to create an infrastructure to execute programs that will run algorithms against raw data (e.g., internal data and external data) in order to generate assignments of payment card holder hobbies and interests. A further insight is to create a delivery mechanism for the data (e.g., standard file layout). Still another insight that can be applied is to create outputs (e.g., a data feed) that contains, at a minimum, payment card holder identification, hobbies and/or interests, and quantification of interest level. The output can be delivered to marketers or summarized in aggregate for advertisers. It can be used for fraud analysis or to create behavior based on information products.

In an illustrative embodiment of this disclosure, a first payment card holder visits several ski resorts in the winter, while a second payment card holder visits the same set of ski resorts in the summer. The first payment card holder can be skiing, while the second payment card holder is more likely into mountain biking.

In another illustrative embodiment of this disclosure, a payment card holder makes a lot of road trips with small ticket gas purchases where the apparent destinations and timing of the road trips coincide with cities hosting motorcycle conventions. The payment card holder is likely a motorcycle enthusiast.

In still another illustrative embodiment of this disclosure, a payment card holder makes several trips to several U.S. cities known for their association with whitewater kayaking, a sport that is not often associated with specific purchases (e.g., no river use fee, no sport specific merchants). It is likely that this payment card holder enjoys whitewater kayaking even though none of the payment card holder's purchases can be directly attributed to kayaking expenses.

Figure 5:
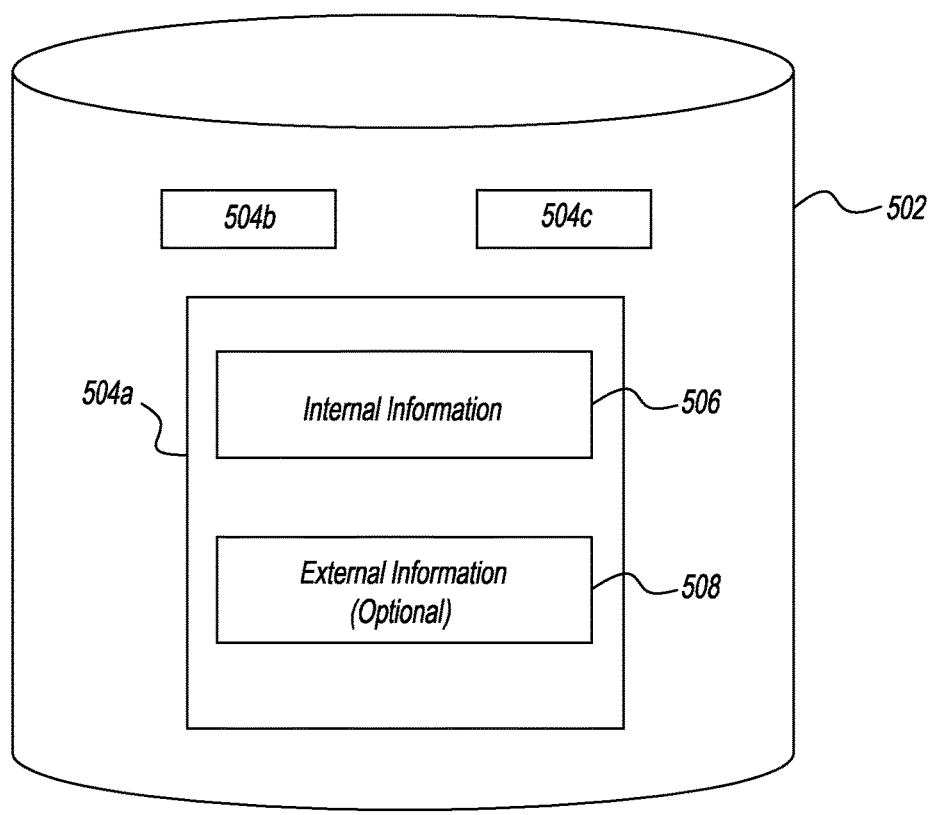
FIG. 5 illustrates an exemplary dataset for the storing, reviewing, and/or analyzing of information used in the systems and the methods of the present disclosure.

Referring to FIG. 5, an exemplary dataset 502 stores, reviews, and/or analyzes of information used in the systems and methods of this disclosure. The dataset 502 can contain a plurality of entries (e.g., entries 504a, 504b, and 504c).

The internal information 506 includes payment card transactions and actual spending. More specifically, internal information 506 can include, for example, payment card transaction information, payment card holder information, merchant information, transaction date and time, transaction amount, payment card holder information (e.g., payment card holder account identifier (likely anonymized), payment card holder geography (potentially modeled), payment card holder type (consumer/business), payment card holder demographics, and the like), merchant information (e.g., merchant name, merchant geography, merchant line of business, and the like), payment transaction amount information, and the like. The external information 508 includes, for example, geographic data, firmographic data, demographic data, lists of individuals with interests and/or hobbies, and other suitable information that can be useful in conducting the systems and methods of this disclosure.

Algorithms can be employed to determine formulaic descriptions of the integration of the internal information and optionally the external information using any of a variety of known mathematical techniques. These formulas, in turn, can be used to derive or generate one or more analyses and updates using any of a variety of available trend analysis algorithms. For example, these formulas can be used to analyze the internal information and the external information to construct one or more groupings of merchants based on merchant line of business or merchant association with a hobby or interest, construct the one or more payment card holder purchase behaviors, construct the one or more payment card holder hobbies or interests, and/or construct one or more predictive payment card holder hobby or interest profiles.

In an embodiment, logic is developed for associating the one or more payment card holder purchase behaviors with the one or more groupings of merchants, to identify one or more payment card holder hobbies or interests. The logic is applied to a universe of payment card holders to identify one or more payment card holder hobbies or interests of the universe of payment card holders.

In accordance with this disclosure, a high level process flow involves creating logical groupings of merchants/geographies/payment card holder behavioral patterns, for example, golf courses (merchant grouping), ski towns (geography grouping), and behavioral patterns (small ticket gas purchases along known motorcycle touring routes); making associations between the logical spend groupings and hobbies/interests that may or may not involve external data, for example, lists of ski towns; using standard statistical techniques to quantify the level of engagement that a payment card holder has in each hobby/interest/activity with the goal being to give a spectrum from "not engaged at all" to "obsessive participant"; and assigning a threshold level of engagement that is used as the definition of characterizing someone as a hobbyist or interested party, for example, if someone stays in a hotel in Vail, Colo., that someone may not be labeled a skier but if that someone stays in Vail and purchases a lift pass, that someone may be labeled a skier.

The high level process flow also outputs a data feed that contains, at a minimum, payment card holder identification, hobbies and/or interests, and quantification of interest level. The output can be delivered to marketers or summarized in aggregate for advertisers. The output can also be used for fraud analysis or to create behavior based on information products. This disclosure provides a process for making hobby/interest assignments to payment card holders to enable such applications.

The several applications of this disclosure include, for example, making offers, preventing fraud (e.g., don't decline a transaction at Pebble Beach golf course if the payment card user is clearly a golfer), targeted advertisements, and the like.

In accordance with the method of this disclosure, payment card holder hobbies and interests can be determined based on payment card holder purchase behavior, and groupings of merchants based on merchant line of business or merchant association with a hobby or interest.

Figure 6:
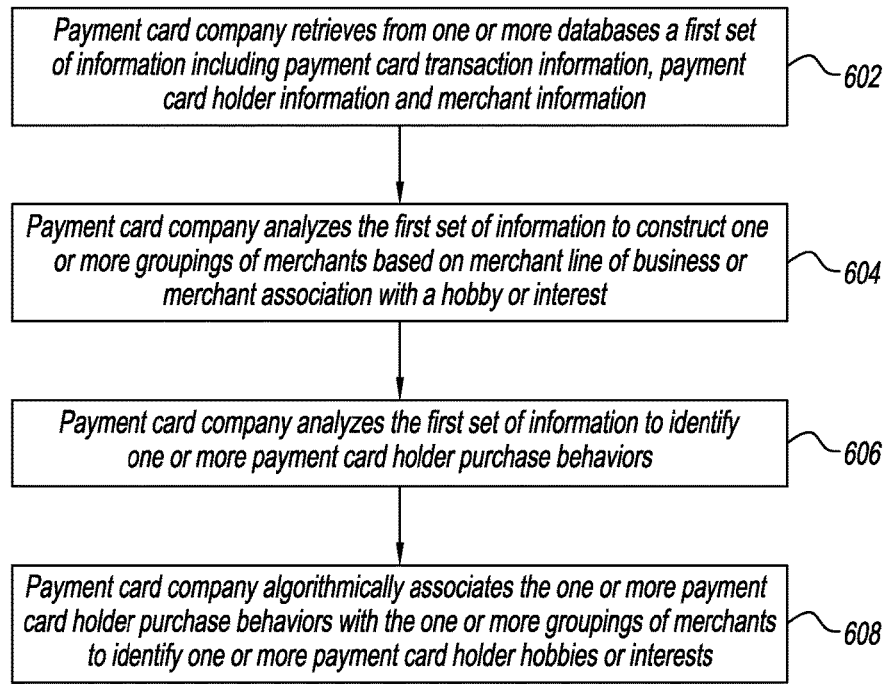
FIG. 6 is a block diagram illustrating a method for identifying payment card holder hobbies and interests in accordance with exemplary embodiments of the present disclosure.

Referring to FIG. 6, the method involves, at 602, a payment card company (part of the payment card company network 150 in FIG. 1) retrieving, from one or more databases, information including payment card transaction information, payment card holder information and merchant information. In particular, the information at 602 can include, for example, transaction date/time, transaction amount, payment card holder information (e.g., payment card holder account identifier (likely anonymized), payment card holder geography (potentially modeled), payment card holder type (consumer/business), payment card holder demographics, and the like), merchant information (e.g., merchant name, merchant geography, merchant line of business, and the like).

The payment card company also optionally retrieves, from one or more databases, external information. The external information includes, for example, geographic data, firmographic data, demographic data, lists of individuals with interests and/or hobbies, and the like.

The first set of information 602 and optionally the external information are analyzed, preferably by a payment card company, at 604 to construct one or more groupings of merchants based on merchant line of business or merchant association with a hobby or interest of those merchants. The groupings of merchants include, for example, merchants in the same line of business, merchant associated with a hobby or interest, and the like. Standard statistical techniques (e.g., clustering, regression, correlation, segmentation, raking, and the like) can be used to construct logical groupings of merchants.

Also, the first set of information 602 and optionally the external information are analyzed, again preferably by a payment card company, at 606 to identify one or more payment card holder purchase behaviors. Standard statistical techniques (e.g., clustering, regression, correlation, segmentation, raking, and the like) can be used to construct logical groupings of merchants.

At 608, one or more payment card holder purchase behaviors are algorithmically associated with the one or more groupings of merchants to identify one or more payment card holder hobbies or interests. This association is usually performed by the payment card company.

For example, if a payment card holder transacts at a couple of golf courses and stays in hotels in known golfing destinations, the payment card holder is likely to be interested in golf. Also, for example, if a payment card holder makes purchases at sporting goods stores during winter months, makes a trip to Aspen, Colo. in the winter, and purchases a season pass at the local ski hill, it is likely that the payment card holder is interested in skiing.

One or more algorithms can be employed to associate payment card holder purchase behaviors with the groupings of merchants in order to identify payment card holder hobbies and/or interests, using any of a variety of known mathematical techniques. Standard statistical techniques (e.g., clustering, regression, correlation, segmentation, raking, and the like) can be used to develop an algorithm that will identify payment card holder hobbies or interests. The output of the algorithms can include formulas for identify payment card holder hobbies and/or interests, as well as a method of quantifying the strength of the payment card holder hobbies and/or interests, for example, a strong interest or a weak interest.

Associations between payment card holders and the groupings of merchants can be assessed based on the one or more predictive payment card holder hobby or interest profiles. For example, in a fraud assessment situation, a payment card holder is observed to make purchases in several ski towns in winter months and shows up for the first time in Park City, Utah. Based on the predictive payment card holder hobby or interest profile, any payment card transaction activity in Park City, Utah would be consistent with the previous spending behavior (e.g., hobby or interest), despite the fact that the payment card holder had never before been to Park City, Utah. As another example, in a targeted advertisement situation, a payment card holder went on three biker rallies on the East Coast last year. Based on the predictive payment card holder hobby or interest profile, the payment card holder would likely be interested in offers related to biker rallies in South Dakota.

The above examples illustrate how the systems and the methods of this disclosure can be used to make associations between payment card holders and groupings of merchants based on the one or more predictive payment card holder hobby or interest profiles. In particular, the systems and the methods of this disclosure can be used by merchants or businesses to better target customers or to enhance existing customer relationships, and also be used to prevent or reduce the risk of fraud in payment card transactions.

As indicated herein, the systems and the methods of this disclosure utilize standard statistical techniques (e.g., clustering, regression, correlation, segmentation, raking, and the like) to associate the payment card holder purchase behaviors with the groupings of merchants to identify payment card holder hobbies or interests, and applying the logic to a universe of payment card holders to identify payment card holder hobbies or interests of the universe of payment card holders. The associations and relationships can be refined by looking at factors such as time, logical geographic breaks, frequency, and the like.

Logic can be created for associating the payment card holder purchase behaviors with the groupings of merchants to identify one or more payment card holder hobbies or interests, and then quantifying their association or relationship (e.g., confidence quantifier). Once the logic has been created, it can be applied to a universe of payment card holders to identify one or more payment card holder hobbies or interests of the universe of payment card holders. Attributes (e.g., confidence, time, frequency, and the like) can then be assigned to clusters and/or members of the clusters to make the data useful to potential end users such as marketers and fraud investigators.

In accordance with the methods of this disclosure, one or more predictive payment card holder hobby or interest profiles are generated based on associations identified between payment card holder purchase behaviors and groupings of merchants. Predictive payment card holder hobby or interest profiles can be selected based on the information obtained and stored in the one or more databases. The selection of information for representation in the predictive payment card holder hobby or interest profiles can be different in every instance. In one embodiment, all information stored in each database can be used for selecting predictive payment card holder hobby or interest profiles. In an alternative embodiment, only a portion of the information is used. The generation and selection of predictive payment card holder hobby or interest profiles can be based on specific criteria.

Figure 7:
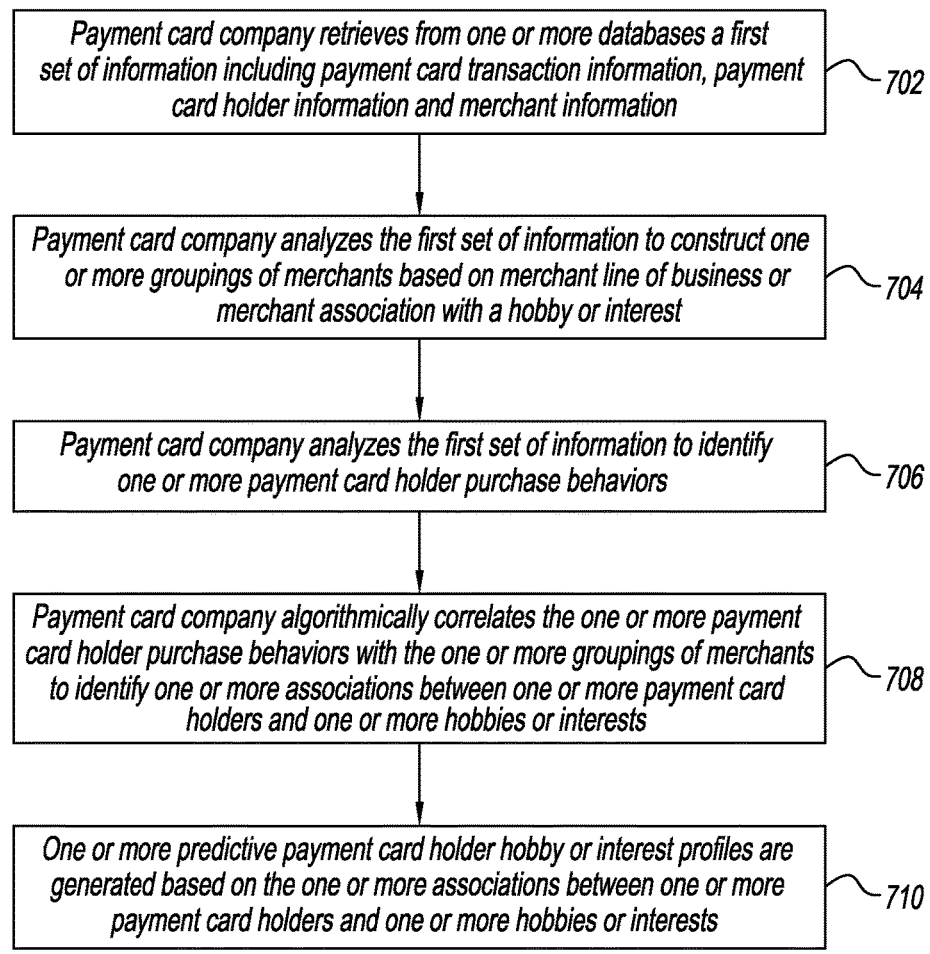
FIG. 7 is a block diagram illustrating a method for generating one or more predictive payment card holder hobby or interest profiles in accordance with exemplary embodiments of the present disclosure.

A method for generating one or more predictive payment card holder hobby or interest profiles is an embodiment of this disclosure. Referring to FIG. 7, the method involves retrieving from one or more databases, at 702, a first set of information comprising payment card transaction information, payment card holder information and merchant information; analyzing the first set of information, at 704, to construct one or more groupings of merchants based on merchant line of business or merchant association with a hobby or interest; analyzing the first set of information, at 706, to identify one or more payment card holder purchase behaviors; algorithmically correlating, at 708, the one or more payment card holder purchase behaviors with the one or more groupings of merchants to identify one or more associations between one or more payment card holders and one or more hobbies or interests; and generating, at step 710, one or more predictive payment card holder hobby or interests profiles based on the one or more associations between one or more payment card holders and one or more hobbies or interests. As shown in FIG. 7, the activities at 702, 704 706 and 708, and even 710, can be performed by a payment card company.

A confidence score can be used for conveying to the one or more entities the hobbies and interests attributable to the one or more payment card holders based on the one or more predictive payment card holder hobby or interest profiles. The confidence score is indicative of likelihood of a payment card holder to have a certain hobby or interest.

Predictive payment card holder hobby or interest profiles are generated from the information obtained from the one or more databases. The information is analyzed, extracted and correlated by, for example, a financial transaction processing company (e.g., a payment card company), and can include financial account information, merchant information, external information, performing statistical analysis on financial account information, the merchant information and the external information, finding correlations between account information, merchant information, external information and payment card holder behaviors, predicting future payment card holder behaviors based on account information, merchant information and external information, relating information on a financial account, a merchant and external information with other financial accounts, merchants and external information, or any other method of review suitable for the particular application of the data, which will be apparent to persons having skill in the relevant art.

Activities and characteristics (e.g., hobbies and interests) attributable to the payment card holders based on the one or more predictive payment card holder hobby or interest profiles are identified. The payment card holders have a propensity to carry out certain activities and to exhibit certain characteristics (e.g., hobbies and interests) based on the one or more predictive payment card holder hobby or interest profiles. The activities and characteristics attributable to the payment card holders and based on the one or more predictive payment card holder hobby or interest profiles are conveyed, for example, by a financial transaction processing entity to an entity making the targeted offer or to an entity involved with preventing fraud. This conveyance enables a targeted offer to be made by the entity to the payment card holders or enables fraud prevention by the entity. The transmittal can be performed by any suitable method as will be apparent to persons having skill in the relevant art.

In an embodiment, the information retrieved from each database can be analyzed to determine behavioral information of the payment card holders. Also, information related to an intent of the payment card holders can be extracted from the behavioral information. The predictive payment card holder hobby or interest profiles can be based upon the behavioral information of the payment card holders and the intent of the payment card holders. The predictive payment card holder hobby or interest profiles can be capable of predicting behavior and intent in the payment card holders (e.g., hobbies and interests).

In another embodiment, a method for generating one or more predictive payment card holder hobby or interest profiles is provided. The method involves a payment card company (part of the payment card company network 150 in FIG. 1) retrieving from one or more databases a first set of information comprising payment card transaction information, payment card holder information and merchant information. The first set of information is analyzed to determine behavioral information of one or more payment card holders. Information related to an intent of the one or more payment card holders is extracted from the behavioral information. One or more predictive payment card holder hobby or interest profiles are generated based on the behavioral information and intent of the one or more payment card holders. The one or more payment card holders have a propensity to carry out certain activities (e.g., hobbies and interests) based on the one or more predictive payment card holder hobby or interest profiles.

A behavioral propensity score is used for conveying to the entity the activities and characteristics attributable to the one or more payment card holders based on the one or more predictive payment card holder hobby or interest profiles. The behavioral propensity score is indicative of a propensity to exhibit a certain behavior (e.g., hobbies and interests).

Predictive payment card holder hobby or interest profiles can be updated or refreshed at a specified time (e.g., on a regular basis or upon request of a party). Updating predictive payment card holder hobby or interest profiles can include updating the entities included in each predictive payment card holder hobby or interest profile with updated demographic data and/or updated financial data and/or updated merchant data. Predictive payment card holder hobby or interest profiles can also be updated by changing the attributes that define each predictive payment card holder hobby or interest profile, and generating a different set of behaviors.

The process for updating behavioral information can depend on the circumstances regarding the need for the information itself.

It will be understood that the present disclosure can be embodied in a computer readable non-transitory storage medium storing instructions of a computer program that when executed by a computer system results in performance of steps of the method described herein. Such storage media can include any of those mentioned in the description above.

Where methods described above indicate certain events occurring in certain orders, the ordering of certain events can be modified. Moreover, while a process depicted as a flowchart, block diagram, and the like can describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it can be based on one or more other things as well. In other words, unless expressly indicated otherwise, as used herein "based on" means "based at least in part on" or "based at least partially on."

The techniques described herein are exemplary, and should not be construed as implying any particular limitation on the present disclosure. It should be understood that various alternatives, combinations and modifications could be devised by those skilled in the art from the present disclosure. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method comprising:
   using a processor, resided in an integrated circuitry, to execute the following steps:
   receiving, from a point of sale device that is part of a three-party or a four-party payment card transaction processing system, raw transaction data for an authorized credit, debit, or payment card transaction of a merchant;
   storing, in one or more databases including a transaction database on an electronic storage device, the raw transaction data, wherein the transaction database comprises merchant data of the merchant, and wherein the raw transaction data includes credit, debit, and payment card holders information including confidential information that personally identifies the payment card holders, and wherein the transaction database is isolated from Internet access;
   retrieving from the one or more databases a first set of information comprising the payment card transaction information, the payment card holders information and merchant information;
   filtering, by a filter, the raw transaction data of the first set of information to remove confidential information of the one or more payment card holders to anonymize the raw transaction data and to prevent fraud and identity theft;
   storing the filtered transaction data of the first set of information of the one or more payment card holders in a filtered transaction database;
   analyzing the first set of information to construct one or more groupings of merchants based on merchant line of business or merchant association with an interest and/or hobby;
   analyzing the filtered transaction data of the first set of information to identify one or more payment card holders purchase behaviors;
   selecting program logic for associating the one or more payment card holder purchase behaviors with the one or more groupings of merchants to identify a universe of interests and/or hobbies;
   applying the logic to a universe of payment card holders in the filtered payment card transaction data to identify interests and/or hobbies of the universe of payment card holders from the universe of interests and/or hobbies;
   extracting estimated intent of the one or more payment cardholders from the purchase behaviors;
   predicting the interests and/or hobbies of the one or more payment card holders based on (a) the purchase behaviors and (b) the estimated intent of the one or more payment card holders;
   conveying, via an Internet accessible website access interface configured to provide website access to the filtered transaction database, a behavioral propensity score to an entity based on the interests and/or hobbies, wherein the behavioral propensity score is indicative of a propensity to exhibit a certain behavior;
   updating the interests and/or hobbies, wherein the updated interests and/or hobbies include updating payment card transaction information, one or more payment card holders information, and merchant information; and
   conveying the updated interests and/or hobbies, by a financial transaction processing entity, to the entity to make a targeted offer or prevent the fraud,
   wherein the logic for constructing the one or more groupings of merchants, analyzing the one or more payment card holder purchase behaviors, and identifying the one or more payment card holder hobbies or interests, is constructed by statistical analysis selected from the group consisting of clustering, regression, correlation, segmentation, and ranking.

2. The method of claim 1, further comprising:
   retrieving from the one or more databases a second set of information comprising external information, wherein the external information comprises geographic data, firmographic data, demographic data, and lists of individuals with the interests and/or hobbies.

3. The method of claim 1, further comprising algorithmically associating the one or more payment card holder purchase behaviors with the one or more groupings of merchants to identify the interests and/or hobbies.

4. The method of claim 3, further comprising determining fraud risk based on the one or more associations between the one or more payment card holder purchase behaviors and the one or more groupings of merchants, or targeting information including at least one or more suggestions or recommendations for payment card holder spending or purchasing activity at a merchant, based on the one or more associations between the one or more payment card holder purchase behaviors and the one or more groupings of merchants.

5. The method of claim 1, further comprising creating one or more datasets to store information relating to the one or more groupings of merchants, the one or more payment card holder purchase behaviors, and the interests and/or hobbies.

6. The method of claim 1, further comprising developing logic for associating the one or more payment card holder purchase behaviors with the one or more groupings of merchants to identify the interests and/or hobbies, and applying the logic to the universe of payment card holders to identify the same or different one or more payment card holder interests and/or hobbies of the universe of payment card holders.

7. The method of claim 1, further comprising correlating the one or more payment card holder purchase behaviors with the one or more groupings of merchants to identify one or more associations between the one or more payment card holders and the interests and/or hobbies.

8. The method of claim 7, further comprising quantifying strength of the one or more associations of the one or more payment card holder purchase behaviors with the one or more groupings of merchants to identify a strength of the interests and/or hobbies.

9. The method of claim 7, further comprising assigning attributes to the one or more associations between the one or more payment card holder purchase behaviors and the one or more groupings of merchants, wherein the attributes are selected from the group consisting of one or more of confidence, time, and frequency.

10. The method of claim 7, further comprising identifying the one or more payment card holders, the one or more groupings of merchants, and strength of the one or more associations between the one or more payment card holders and the one or more groupings of merchants.

11. The method of claim 7, further comprising quantifying strength of the one or more associations between the one or more payment card holder purchase behaviors and the one or more groupings of merchants.

12. The method of claim 1, further comprising algorithmically constructing the one or more groupings of merchants, the one or more payment card holder purchase behaviors, and the interests and/or hobbies.

13. A payment card system comprising:
an electronic storage device including
  a transaction database of the payment card system including raw payment card transaction data from a plurality of payment card holders, wherein the electronic storage device receives and stores, in the transaction database: a first set of information comprising merchant data of a merchant and raw transaction data, wherein the raw transaction data includes credit, debit, or payment card transaction data that includes confidential information that personally identifies the payment card holders, and wherein the transaction database is isolated from Internet access;
  a filtered transaction database comprising filtered payment card transaction data of the plurality of payment card holders; and program logic including logic for statistical analysis selected from the group consisting of clustering, regression, correlation, segmentation and ranking;
an Internet accessible website access interface configured to provide website access to the filtered transaction database; and
an integrated circuitry comprising a processor, wherein the processor is configured to:
  filter, by a filter, the raw transaction data of the first set of information to remove the confidential information that personally identifies the plurality of payment card holders, to anonymize the raw transaction data and to prevent fraud and identity theft, thus yielding the filtered payment card transaction data;
  store the filtered payment card transaction data of the first set of information in the filtered transaction database;
  analyze the first set of information to construct one or more groupings of merchants based on merchant line of business or merchant association with an interest and/or hobby;
  analyze the filtered payment card transaction data of the first set of information in the filtered transaction database to identify one or more payment card holder purchase behaviors;
  selecting program logic for associating the one or more payment card holder purchase behaviors with the one or more groupings of merchants to identify the interests and/or hobbies;
  apply the logic to a universe of payment card holders in the filtered payment card transaction data to identify interests and/or hobbies of the universe of payment card holders;
  extracting estimated intent of the one or more of the payment cardholders from the one or more payment cardholder purchase behaviors;
  predicting interests and/or hobbies of the one or more payment card holders based on (a) the purchase behaviors and (b) the estimated intent of the one or more payment card holders;
  conveying a behavioral propensity score to an entity based on the interests and/or hobbies, wherein the behavioral propensity score is indicative of a propensity to exhibit a certain behavior;
  updating the interests and/or hobbies, wherein the updated interests and/or hobbies include updating the payment card transaction information, the one or more payment card holders information, and the merchant information, and
  conveying the updated interests and/or hobbies, by a financial transaction processing entity, to the entity to make a targeted offer or prevent the fraud,
  wherein logic for constructing the one or more groupings of merchants, analyzing the one or more payment card holder purchase behaviors, and identifying the one or more payment card holder hobbies or interests, are constructed by statistical analysis selected from the group consisting of clustering, regression, correlation, segmentation and ranking.

14. The system of claim 13, wherein the processor is configured to retrieve from one or more databases a second set of information comprising external information; wherein the external information comprises geographic data, firmographic data, demographic data, and lists of individuals with the updated interests and/or hobbies.

15. The system of claim 13, wherein the processor is configured to algorithmically associate the one or more payment card holder purchase behaviors with the one or more groupings of merchants to identify the interests and/or hobbies.

16. The system of claim 13, wherein the processor is configured to create one or more datasets to store information relating to the one or more groupings of merchants, the one or more payment card holder purchase behaviors, and the-Interests and/or hobbies.

17. The system of claim 13, wherein the processor is configured to correlate the one or more payment card holder purchase behaviors with the one or more groupings of merchants to identify one or more associations between the one or more payment card holders and the interests and/or hobbies.

18. The system of claim 17, wherein the processor is configured to quantify strength of the one or more associations of the one or more payment card holder purchase behaviors with the one or more groupings of merchants to identify a strength of the interests and/or hobbies.

19. The system of claim 17, wherein the processor is configured to assign attributes to the one or more associations between the one or more payment card holder purchase behaviors and the one or more groupings of merchants, wherein the attributes are selected from the group consisting of one or more of confidence, time, and frequency.

20. The system of claim 17, wherein the processor is configured to identify one or more payment card holders, one or more groupings of merchants, and strength of the one or more associations between the one or more payment card holders and the one or more groupings of merchants.

21. The system of claim 15, wherein the processor is configured to determine fraud risk based on the one or more associations between the one or more payment card holder purchase behaviors and the one or more groupings of merchants, or target information including at least one or more suggestions or recommendations for payment card holder spending or purchasing activity at a merchant, based on the one or more associations between the one or more payment card holder purchase behaviors and the one or more groupings of merchants.

22. A computer readable non-transitory storage medium for storing computer program logic including instructions that when executed by a processor, resided in an circuitry, generates interests and/or of one or more payment card holders, the medium comprising instructions for:
  receiving, from a point of sale device that is part of a three-party or a four-party payment card transaction processing system, raw transaction data for an authorized credit, debit, or payment card transaction of a merchant;
  storing, in one or more databases including a transaction database on an electronic storage device, the raw transaction data, wherein the transaction database comprises merchant data of the merchant, and wherein the raw transaction data includes credit, debit, and/or payment card holder transaction data including personally identifying confidential information that personally identifies a plurality of the payment card holders, wherein the transaction database is isolated from Internet access;
  retrieving from one or more databases a first set of information comprising payment card transaction information, payment card holder information and merchant information;
  filtering, by a filter, the raw transaction data of first set of information to remove the confidential information of the one or more payment card holders to anonymize the raw transaction data and to prevent fraud and identity theft;
  storing the filtered payment card transaction data of the first set of information in a filtered transaction database;
  analyzing the first set of information to construct one or more groupings of merchants based on merchant line of business or merchant association with one or more interests and/or hobbies;
  analyzing the filtered payment card transaction data of the first set of information in the filtered transaction database to identify one or more payment card holder purchase behaviors;
  select program logic for associating the one or more payment card holder purchase behaviors with the one or more groupings of merchants to identify the interests and/or hobbies;
  apply the program logic to a universe of payment card holders in the filtered payment card transaction data to identify interests and/or hobbies of the universe of payment card holders;
  extracting estimated intent of the one or more payment cardholders from the one or more payment cardholder purchase behaviors;
  correlating the one or more payment card holder purchase behaviors with the one or more groupings of merchants to identify one or more associations between the one or more payment card holders and the one or more hobbies or interests;
  predicting the hobbies or interests of the one or more payment card holders based on (a) the one or more associations between one or more payment card holders and (b) the extracted intent;
  conveying, via an Internet accessible website access interface configured to provide website access to the filtered transaction database, a behavioral propensity score to an entity based on the hobbies or interests, wherein the behavioral propensity score is indicative of a propensity to exhibit a certain behavior;
  updating the interests and/or hobbies, where the updated hobbies or interests includes updating the payment card transaction information, the one or more payment card holders information, and the merchant information; and
  conveying the updated interests and/or hobbies, by a financial transaction processing entity, to the entity to make a targeted offer or prevent the fraud,
  wherein the program logic for constructing the one or more groupings of merchants, analyzing the one or more payment card holder purchase behaviors, and identifying the one or more payment card holder hobbies or interests, are constructed by statistical analysis selected from the group consisting of clustering, regression, correlation, segmentation and ranking.

* * * * *